(12) United States Patent
Katsura et al.

(10) Patent No.: US 11,008,067 B2
(45) Date of Patent: May 18, 2021

(54) BICYCLE OPERATING DEVICE

(71) Applicant: Shimano Inc., Sakai (JP)

(72) Inventors: Takafumi Katsura, Osaka (JP); Takuro Jimbu, Osaka (JP); Kensuke Tagaya, Osaka (JP)

(73) Assignee: Shimano Inc., Sakai (JP)

( * ) Notice: Subject to any disclaimer, the term of this patent is extended or adjusted under 35 U.S.C. 154(b) by 0 days.

(21) Appl. No.: 16/178,333

(22) Filed: Nov. 1, 2018

(65) Prior Publication Data

US 2019/0071149 A1 Mar. 7, 2019

Related U.S. Application Data

(63) Continuation of application No. 14/878,978, filed on Oct. 8, 2015, now Pat. No. 10,279,867, which is a continuation-in-part of application No. 14/725,868, filed on May 29, 2015, now Pat. No. 9,821,884.

(51) Int. Cl.
| | |
|---|---|
| *B62M 25/04* | (2006.01) |
| *B62K 23/02* | (2006.01) |
| *B62K 21/12* | (2006.01) |
| *B62K 23/06* | (2006.01) |
| *B62M 25/08* | (2006.01) |
| *B62M 25/00* | (2006.01) |

(52) U.S. Cl.
CPC .............. *B62M 25/04* (2013.01); *B62K 21/12* (2013.01); *B62K 23/02* (2013.01); *B62K 23/06* (2013.01); *B62M 25/08* (2013.01); *B62M 2025/006* (2013.01)

(58) Field of Classification Search
CPC ....... B62M 25/04; B62M 25/08; B62K 21/12; B62K 23/02; B62K 23/06
See application file for complete search history.

(56) References Cited

U.S. PATENT DOCUMENTS

| | | | |
|---|---|---|---|
| 5,247,431 A * | 9/1993 | Liu | B62J 6/005 |
| | | | 362/474 |
| 6,546,827 B2 | 4/2003 | Irie | |
| 7,350,436 B2 | 4/2008 | Fujii | |
| 7,565,848 B2 | 7/2009 | Fujii | |
| 7,908,940 B2 * | 3/2011 | Naka | B62M 25/08 |
| | | | 74/551.8 |
| 8,035,046 B2 | 10/2011 | Perini | |
| 8,056,439 B2 * | 11/2011 | Fukui | B62K 23/06 |
| | | | 403/370 |
| 8,297,143 B2 * | 10/2012 | Fujii | B62K 23/02 |
| | | | 200/61.88 |
| 2007/0199810 A1 | 8/2007 | Ieda et al. | |

FOREIGN PATENT DOCUMENTS

| | | | | |
|---|---|---|---|---|
| CH | 213359 A * | 1/1941 | ............ | B62K 21/26 |
| EP | 1582452 A2 | 10/2005 | | |
| EP | 2275338 A1 | 1/2011 | | |

(Continued)

*Primary Examiner* — Thomas C Diaz
(74) *Attorney, Agent, or Firm* — Alleman Hall Creasman & Tuttle LLP

(57) ABSTRACT

A bicycle operating device, having a center axis, comprises a mounting structure configured to be press fitted into a free end of a bicycle handlebar; and an operating structure for an operation of a bicycle component, the operating structure being coupled to the mounting structure.

19 Claims, 11 Drawing Sheets

(56) References Cited

FOREIGN PATENT DOCUMENTS

| | | | | |
|---|---|---|---|---|
| EP | 2562070 | A1 | 2/2013 | |
| EP | 2657121 | A1 | 10/2013 | |
| GB | 226266 | A * | 12/1924 | ............ B62M 25/04 |
| GB | 1016903 | A | 1/1966 | |
| JP | 2007223495 | A | 9/2007 | |

* cited by examiner

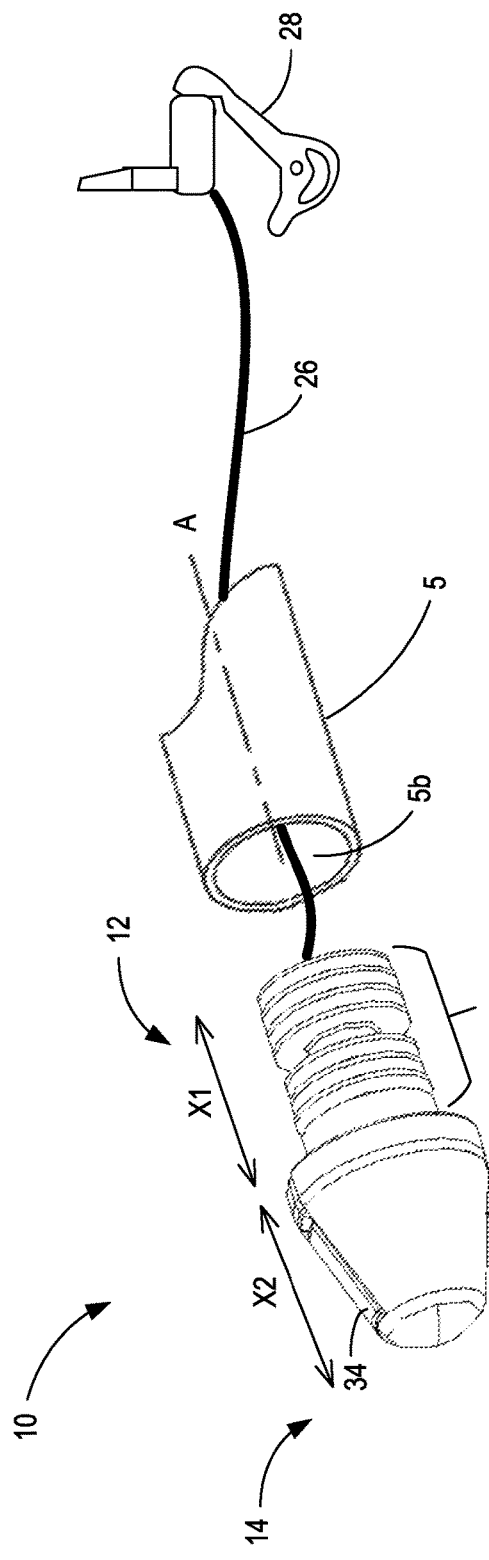
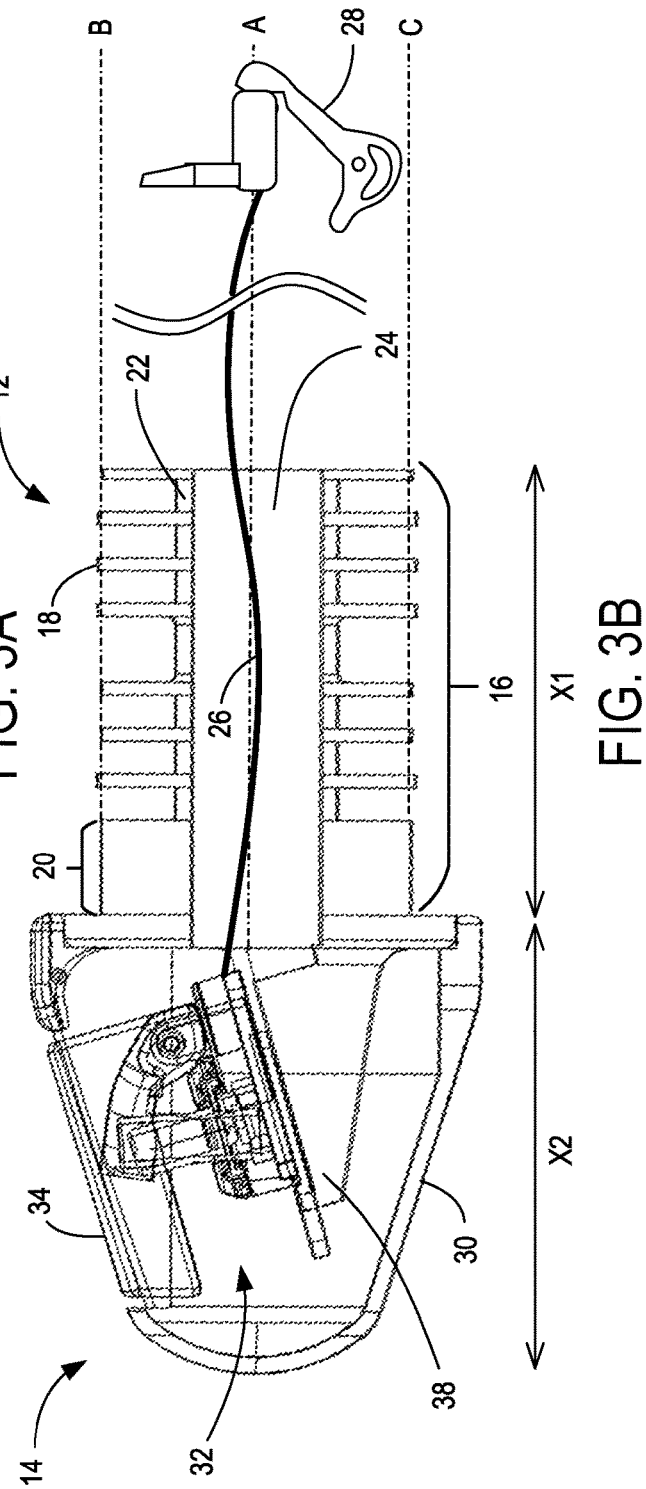
FIG. 3A
FIG. 3B

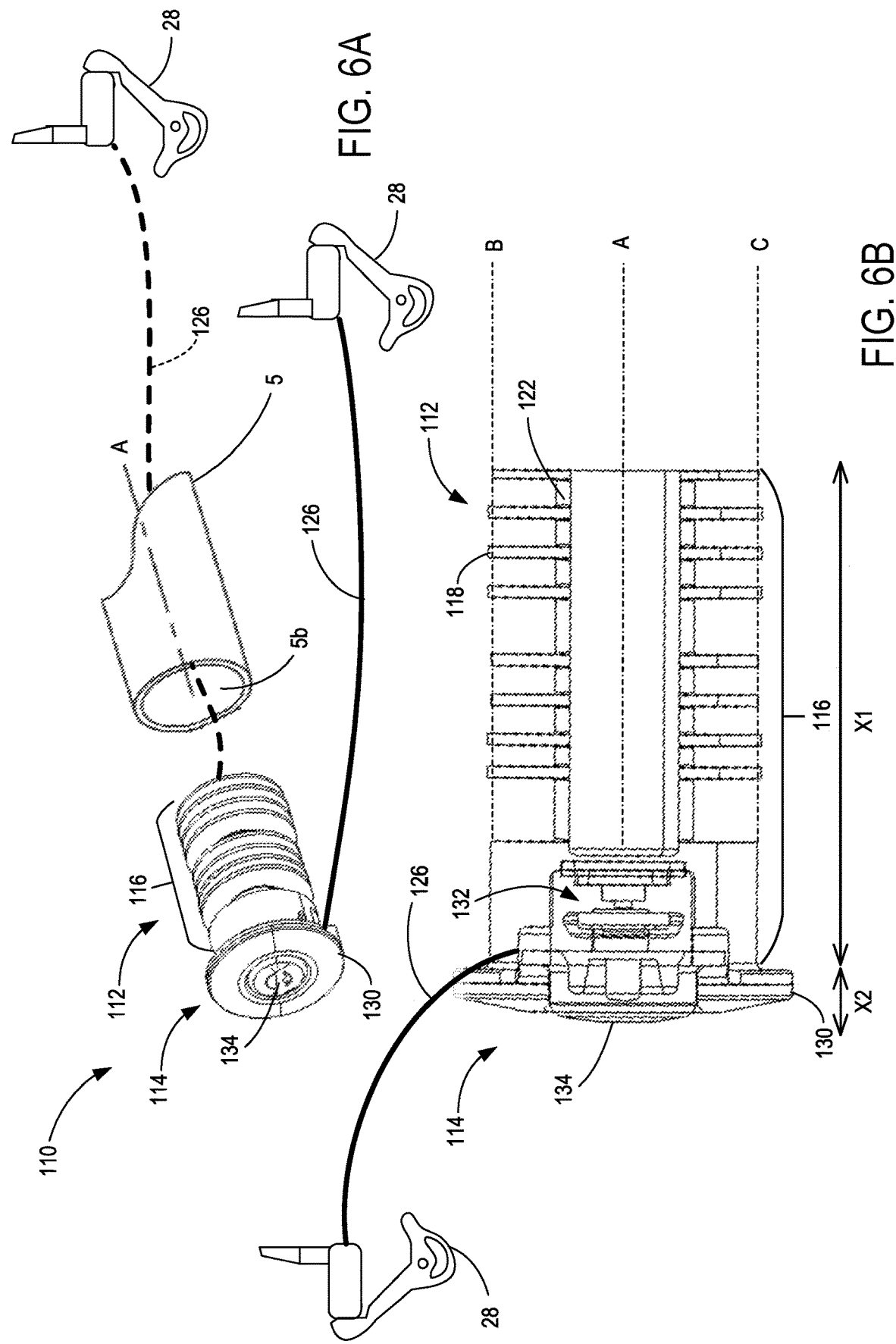

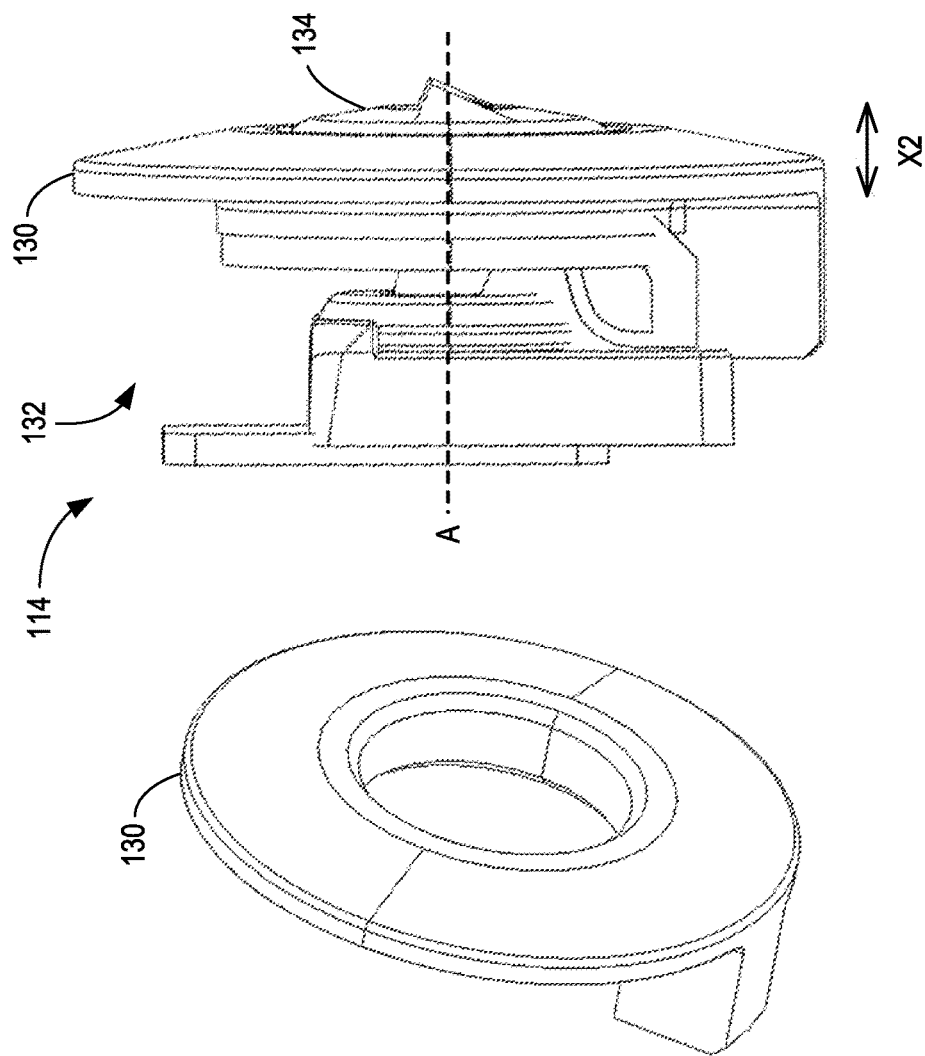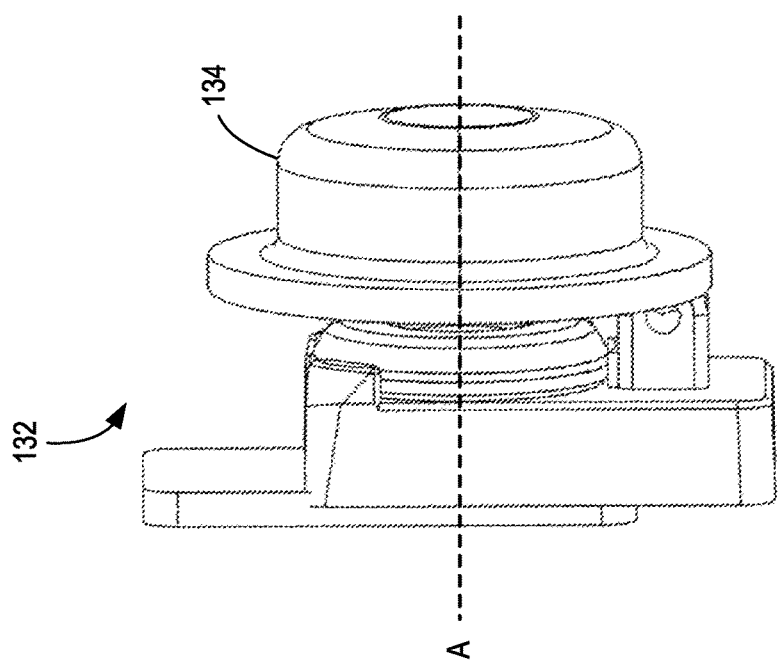

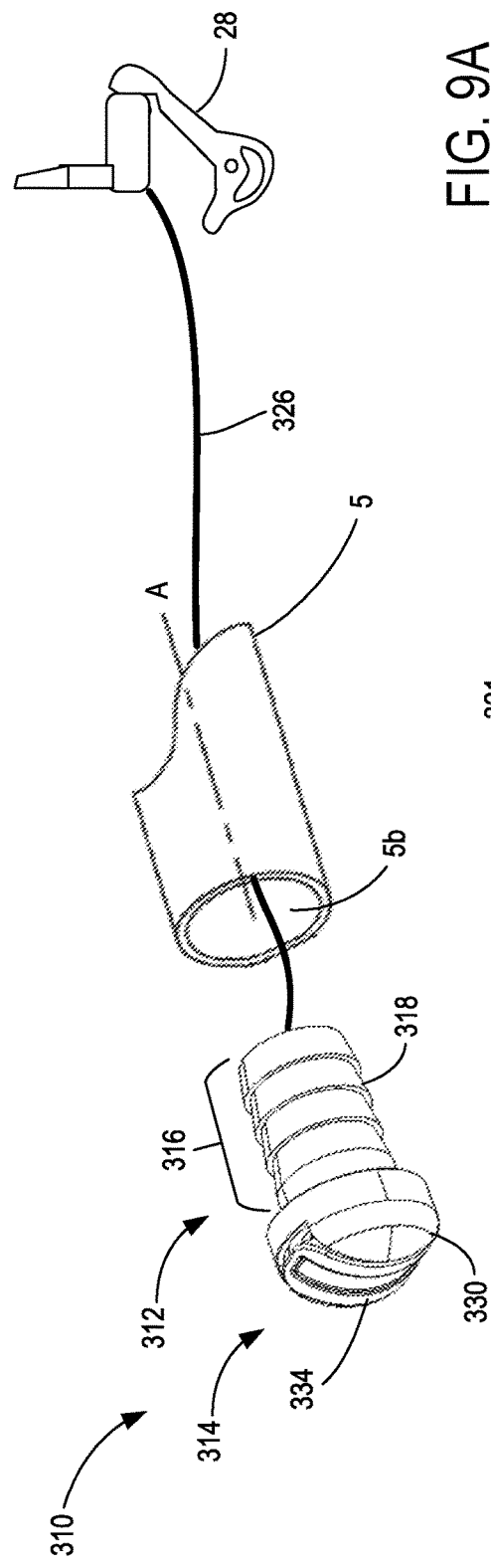
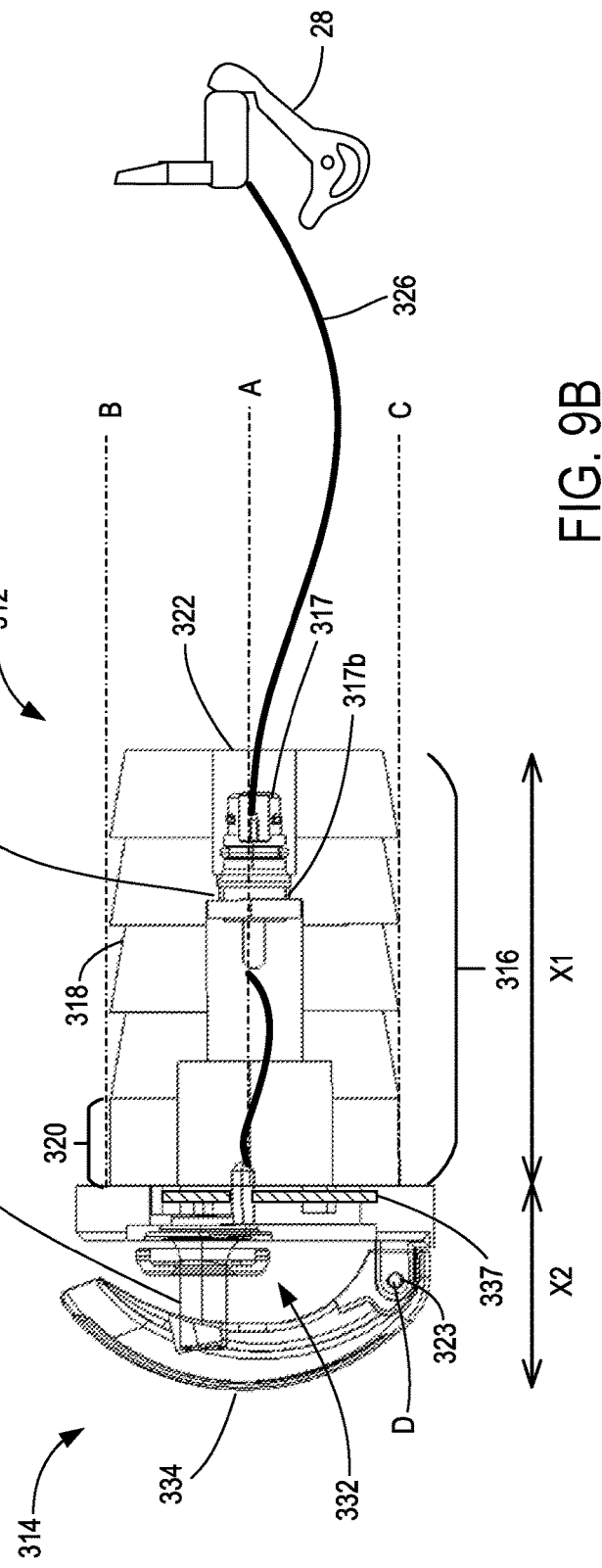

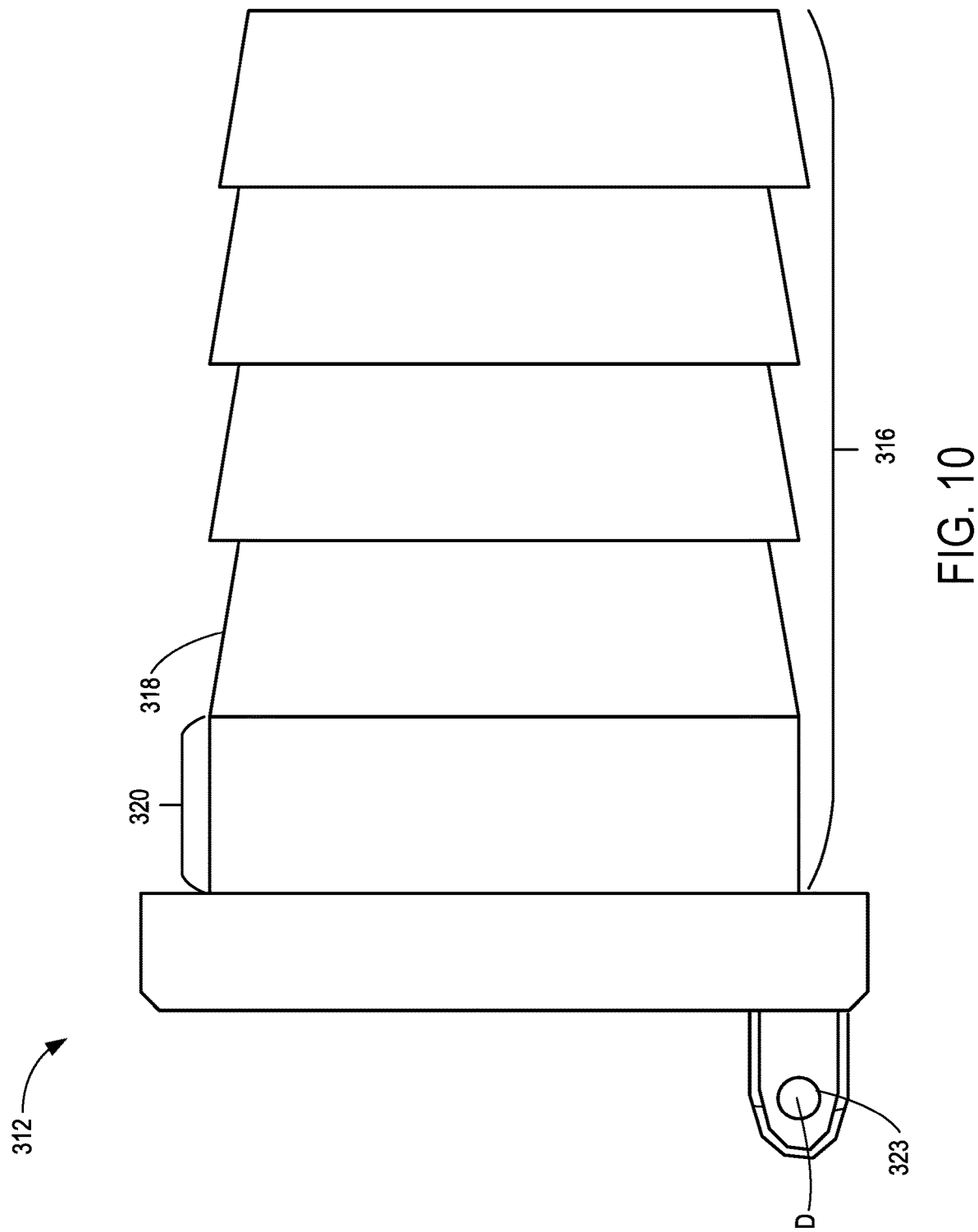

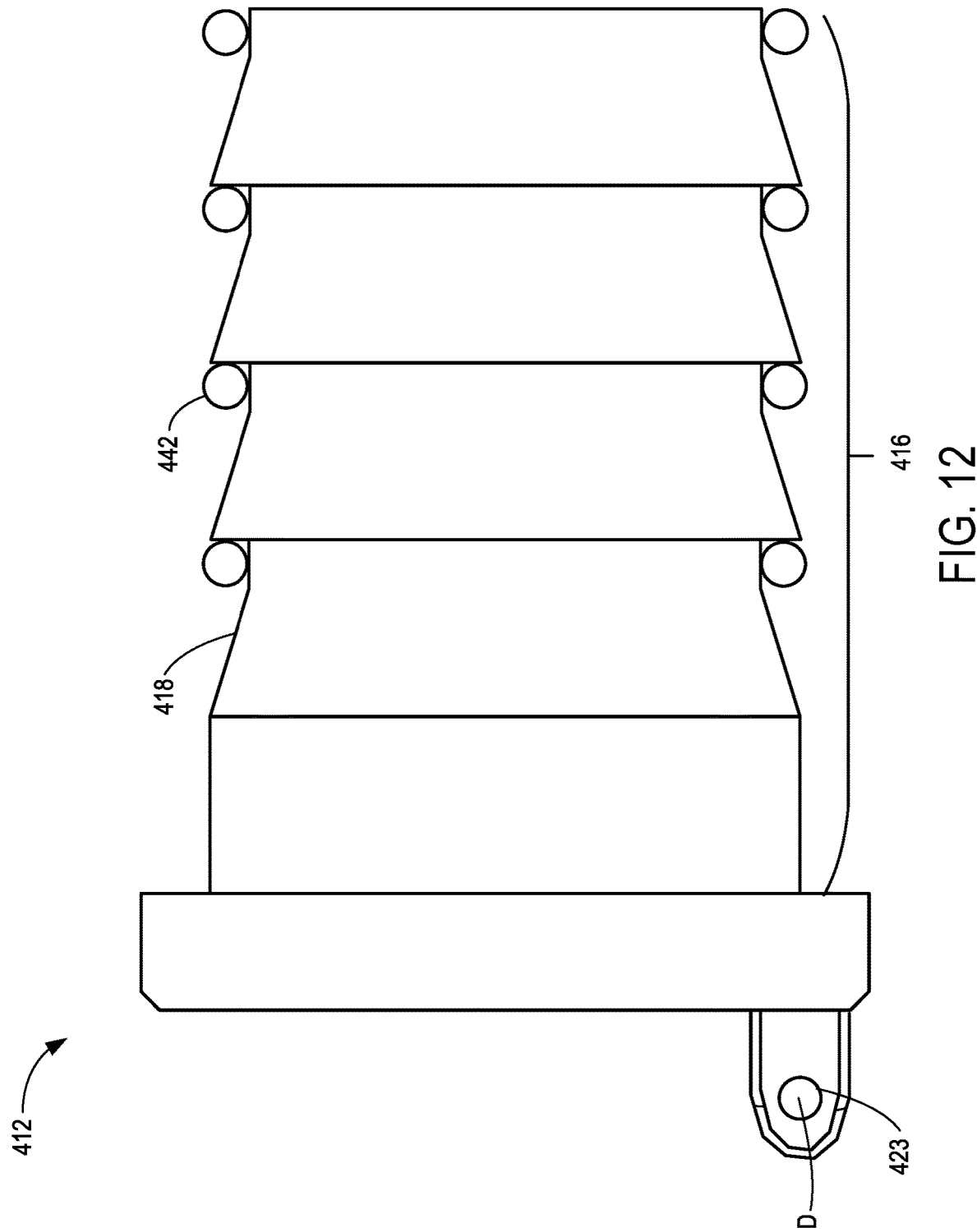

BICYCLE OPERATING DEVICE

CROSS REFERENCE TO RELATED APPLICATIONS

This application is a continuation of U.S. application Ser. No. 14/878,978, entitled BICYCLE OPERATING DEVICE, filed Oct. 8, 2015, which is a continuation-in-part of U.S. application Ser. No. 14/725,868, entitled BICYCLE OPERATING DEVICE, filed May 29, 2015, the entire disclosures of each of which are hereby incorporated by reference for all purposes.

BACKGROUND

The present invention is directed to a bicycle operating device.

Conventional mounting structures of bicycle bar-end type shifters include expanders. Conventional bar-end type shifters often require a tedious mounting step, which involves inserting a mounting structure of the bar-end type shifter into an end of the handlebar and then expanding an expander of the bar-end-type shifter using a tool. Further, in the conventional bar-end type shifter, it is difficult to pass an electrical wire or a mechanical control wire through the center of the handlebar. Therefore, a user cannot freely rotate the bar-end type shifter to position it in a preferred orientation.

SUMMARY

To address the above issues, a bicycle operating device is provided. According to a first aspect of the invention, a bicycle operating device is provided that has a center axis and comprises a mounting structure configured to be press fitted into a free end of a bicycle handlebar; and an operating structure for an operation of a bicycle component, the operating structure being coupled to the mounting structure. One potential advantage of this configuration is that it is quick and easy to mount the bicycle operating device onto the handlebar.

In this aspect, the mounting structure may be configured to be press fitted into the free end of the bicycle handlebar without using a tool. One potential advantage of this configuration is that it is quick and easy to mount the operating device.

In this aspect, the mounting structure may include a holding member configured to hold the mounting structure in the free end of the bicycle handlebar. One potential advantage of this configuration is that the operating device may be configured to be lighter since an expand structure is not necessary.

In this aspect, the holding member may be made of a resin material. One potential advantage of this configuration is that the coefficient of friction may be increased to secure the operating device to the handlebar.

In this aspect, the holding member may be configured to deform when the mounting structure is press fitted into the free end of the bicycle handlebar. One potential advantage of this configuration is that the operating device may securely fit into the bicycle handlebar.

In this aspect, the holding member may be at least partly elastically deformable. One potential advantage of this configuration is that the operating device may securely fit into the bicycle handlebar.

In this aspect, the mounting structure may include a shaft member configured to extend from the operating structure in an axial direction parallel to the center axis, and the holding member extends in a radial direction away from the center axis from the shaft member. One potential advantage of this configuration is that the dimensions of the operating device are adapted to the radius and axial length of the handlebar.

In this aspect, the holding member may include a plurality of holding portions. One potential advantage of this configuration is that the holding member may mount the operating device more securely with a plurality of holding portions.

In this aspect, the plurality of holding portions may be disposed along an axial direction parallel to the center axis so that a gap is formed between adjacent holding portions. One potential advantage of this configuration is that a space is provided for the deformation of the holding portions when press fitted into the end of the handlebar.

In this aspect, the holding member may include a support portion disposed between the plurality of holding portions and the operating structure in an axial direction, and an axial length of the support portion is greater than an axial length each of the holding portions. One potential advantage of this configuration is that the strength of the mounting structure is enforced to withstand an operating force by the rider to operate an operating structure.

In this aspect, the shaft member may include a through hole extending along the axial direction parallel to the center axis from the operating structure. One potential advantage of this configuration is that a passage is provided for an electrical cable so that the cable will not have to pass outside the mounting structure.

In this aspect, the center axis may pass through the through hole. One potential advantage of this configuration is that the angular position of the operating device with respect to the handlebar about the center axis is not restricted by the electrical cable which passes through the through hole.

In this aspect, the operating structure may include an electrical switch unit configured to output a signal to operate the bicycle component and an electrical cable electrically connected to the electrical switch unit, the electrical cable being disposed inside the through hole. One potential advantage of this configuration is that a passage is provided for an electrical cable so that the cable will not have to pass outside the mounting structure.

In this aspect, the holding member may have an annular shape. One potential advantage of this configuration is that the holding member is adapted to a handlebar with an annular-shaped diameter.

In this aspect, the operating structure may include a housing member, the holding member has a first axial length in a direction of the center axis, and the housing member may have a second axial length in the direction of the center axis, the second axial length being shorter than or equal to the first axial length. One potential advantage of this configuration is that the press fitted mounting structure provides stable support for the operating device.

In this aspect, the operating structure may include an electrical switch unit configured to output a signal to operate the bicycle component. One potential advantage of this configuration is that, unlike certain hydraulic systems, minimal force is required by the user to output a signal.

In this aspect, the mounting structure may include a switch unit support member for supporting the electrical switch unit. One potential advantage of this configuration is that the electrical switch unit may be securely mounted onto the bicycle.

In this aspect, the switch unit support member may be at least partially disposed inside the operating structure. One potential advantage of this configuration is that the switch unit support member is secured inside the operating structure.

In this aspect, the mounting structure may include an inlet opening to which an electrical cable electrically connected to the electrical switch unit is inserted, the switch unit support member being disposed adjacent to the inlet opening. One potential advantage of this configuration is that operating structure may be structurally integrated with the mounting structure.

In this aspect, the electrical switch unit may be supported on the switch unit support member so that at least part of the electrical switch unit is disposed within the bicycle handlebar in a state where the mounting structure is press fitted into the free end of the bicycle handlebar. One potential advantage of this configuration is that the length of the operating structure and the housing member can be made shorter.

In this aspect, the mounting structure may include an additional holding member attached to the holding member. One potential advantage of this configuration is that the mounting properties of the operating device are augmented with an additional holding member.

In this aspect, the additional holding member may be detachably attached to the holding member. One potential advantage of this configuration is that the mounting properties of the operating device are flexibly configured by the user.

In this aspect, the operating structure may include a housing member in which at least part of the electrical switch unit is to be disposed, the housing member comprises at least part of a peripheral surface of the operating structure, and the peripheral surface of the operating structure may be substantially axially symmetrical with respect to the center axis. One potential advantage of this configuration is that the operation of the electrical switch unit, disposed on the housing member, is more conveniently accessible.

In this aspect, the peripheral surface may be tapered in an axial direction parallel to the center axis. One potential advantage of this configuration is that the peripheral surface is oriented in such a way that allows the user to easily operate it manually.

In this aspect, the electrical switch unit may include a user operating member which constitutes a part of the peripheral surface of the operating structure. One potential advantage of this configuration is that the user operating member, constituting a part of the peripheral surface, is more conveniently accessible.

In this aspect, the electrical switch unit may include a user operating member configured to be operated in an axial direction parallel to the center axis. One potential advantage of this configuration is that the electrical switch unit is conveniently accessible to be operated by a user's fingers when the handlebar is gripped by a user's hand.

In this aspect, the electrical switch unit may include a wireless transmitter configured to transmit a wireless signal to operate the bicycle component. One potential advantage of this configuration is that electrical cables are not necessary to communicate between the electrical switch unit and the bicycle component.

In this aspect, the operating structure may include a power supply configured to supply an electrical power to the electrical switch unit. One potential advantage of this configuration is that extra power cables are not necessary to supply electrical power from outside the operating structure.

In another aspect, a bicycle operating device is provided that has a center axis and comprises a mounting structure configured to be press fitted into a free end of a bicycle handlebar. An operating structure includes an electrical switch unit configured to output a signal to operate a bicycle component and a housing member in which at least part of the electrical switch unit is to be disposed, the operating structure being coupled to the mounting structure. The holding member has a first axial length in an axial direction parallel to the center axis and the housing member has a second axial length in the axial direction parallel to the center axis, the second axial length being shorter than or equal to the first axial length. The potential advantages of this configuration are that the user may freely rotate the operating device so that it may be positioned in a preferred orientation, mounting is quick and easy, and the operating device is configured to be lighter because an expand structure is not necessary.

In another aspect, a bicycle operating device is provided that has a center axis and comprises a mounting structure configured to be mounted into a free end of a bicycle handlebar. An operating structure includes an electrical switch unit configured to output a signal to operate a bicycle component and a housing member in which at least part of the electrical switch unit is to be disposed. The operating structure is coupled to the mounting structure, and a length of the housing member in an axial direction parallel to the center axis is less than 35 mm. The potential advantages of this configuration is that the size of the operating device is compact due to the shortened length of the housing member.

In another aspect, a bicycle operating device comprises a mounting structure configured to be mounted into a free end of a bicycle handlebar. An operating structure includes an electrical switch unit configured to output a signal to operate a bicycle component, the operating structure being coupled to the mounting structure. At least part of the electrical switch unit is disposed in the bicycle handlebar in a state where the mounting structure is mounted into the free end of the bicycle handlebar. One potential advantage of this configuration is that the length of the operating structure and the housing member can be made shorter.

In another aspect, a bicycle operating device is provided that has a center axis and comprises a mounting structure configured to be mounted into a free end of a bicycle handlebar. An operating structure is coupled to the mounting structure. The operating structure includes an electrical switch unit configured to output a signal to operate a bicycle component, and a housing member in which at least part of the electrical switch unit is to be disposed, the housing member comprising at least part of a peripheral surface of the operating structure, wherein the peripheral surface of the operating structure is substantially axially symmetrical with respect to the center axis. One potential advantage of this configuration is that the length of the operating structure and the housing member can be made shorter.

In this aspect, the peripheral surface may be tapered in an axial direction parallel to the center axis. One potential advantage of this configuration is that the peripheral surface is oriented in such a way that allows the user to easily operate it manually.

In this aspect, the electrical switch unit may include a user operating member which constitutes a part of the peripheral surface of the operating structure. One potential advantage of this configuration is that the user operating member, constituting a part of the peripheral surface, is more conveniently accessible.

In another aspect, the holding member may be a separate member from the shaft member and configured to be detachably attached to the shaft member. One potential advantage of this configuration is that a user may easily interchange different holding members that are adapted for differently sized handlebars.

In this aspect, the holding member is selected from one of a plurality of differently sized holding members, and the holding members each have a different outside diameter. One potential advantage of this configuration is that the holding members are adapted for differently sized handlebars.

In this aspect, the shaft member includes a first inner periphery with a first diameter and a second inner periphery with a second diameter, the first diameter being less than the second diameter and the second inner periphery being located closer to an electrical switch unit of the operating structure than the first inner periphery. One potential advantage of this configuration of the tapered shaft member is that it supports the tapered configuration of the holding member.

In this aspect, at least one of the plurality of holding portions is tapered in an axial direction parallel to the center axis. One potential advantage of this configuration is that the tapered shape of the holding member makes the force needed for press fitting the mounting structure into the handlebar less than the force needed to remove the mounting structure from the handlebar.

In this aspect, the at least one of the plurality of holding portions includes a first outer periphery with a first outer diameter and a second outer periphery with a second outer diameter, the first outer diameter being less than the second outer diameter and the second outer periphery being located closer to the operating structure than the first outer periphery. One potential advantage of this configuration is that the tapered shape of the holding member makes the force needed for press fitting the mounting structure into the handlebar less than the force needed to remove the mounting structure from the handlebar.

In this aspect, the operating structure includes a user operating member, and the center axis intersects the user operating member. One potential advantage of this configuration is that the alignment of the user operating member along the center axis of the handlebar improves accessibility.

In this aspect, the user operating member is pivotally attached to one of the mounting structure and a housing member of the operating structure about a pivot axis. One potential advantage of this configuration is that the pivot attachment forms part of a mechanism that allows the user to conveniently click or press against a button.

In this aspect, the pivot axis is substantially perpendicular to the center axis. One potential advantage of this configuration is that the user's pressing action is aligned with the handlebar when gripped during normal usage.

In this aspect, the electrical switch unit includes a button that is located on an opposite side of the center axis from the pivot axis as viewed from an axial direction of the pivot axis. One potential advantage of this configuration is that the button may be easily operated by pressing against the user operating member.

In this aspect, the user operating member includes a curved shape as viewed from an axial direction of the pivot axis. One potential advantage of this configuration is that the user operating member may be easily pressed by one finger while gripping the handlebar.

In this aspect, the pivot axis is located at one end of the one of the mounting structure and the housing member. The user operating member extends from the pivot axis to the other end of the one of the mounting structure and the housing member as viewed from the axial direction of the pivot axis. One potential advantage of this configuration is that the user operating member can be easily operated by pressing against any point between the pivot axis and the other end of the mounting structure or housing member.

In this aspect, the bicycle operating device further comprises an electrical cable connector. One potential advantage of this configuration is that the electrical cable may freely move radially to relieve cable tension.

In this aspect, the mounting structure includes an electrical connector holder supporting the electrical cable connector. One potential advantage of this configuration is that the axial movement toward and away from the user operating member may be restricted.

In this aspect, the electrical cable connector is snap-fitted into the electrical connector holder. One potential advantage of this configuration is that the electrical cable may be easily attached or detached from the bicycle operating device during assembly or disassembly.

In this aspect, the mounting structure includes a shaft member with a holding portion formed on an external surface thereof, and the electrical connector holder is formed on an internal surface of the shaft member. One potential advantage of this configuration is that the electrical connector holder does not need to be formed out of a separate part, and it may be formed out of an existing structure instead.

In another aspect, the mounting structure includes an additional holding member that includes an elastic ring. One potential advantage of this configuration is that additional contact points may be provided with the interior of the handlebar to improve friction and adhesion.

In this aspect, the elastic ring is an O-ring. One potential advantage of this configuration is that O-rings are easily manufactured and readily available to be repurposed into additional holding members.

In this aspect, the additional holding member includes a plurality of elastic rings. One potential advantage of this configuration is that additional contact points may be provided with the interior of the handlebar to improve friction and adhesion.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which:

FIGS. 3A and 3B illustrate perspective views of a bicycle operating device provided on a free end of a bicycle handlebar according to the first embodiment of the present invention.

FIGS. 6A and 6B illustrate perspective views of a bicycle operating device provided on a free end of a bicycle handlebar according to the second embodiment of the present invention.

FIG. 8A illustrates an electrical switch unit and user operating member according to the second embodiment of the present invention.

FIG. 8B illustrates a housing member according to the second embodiment of the present invention.

FIG. 8C illustrates an operating structure with an electrical switch unit and housing member according to the second embodiment of the present invention.

FIGS. 9A and 9B illustrate perspective views of a bicycle operating device provided on a free end of a bicycle handlebar according to the third embodiment of the present invention.

FIG. 10 illustrates a mounting structure with a holding member that includes holding portions according to the third embodiment of the present invention.

FIG. 12 illustrates a mounting structure with at least an additional holding member according to the fourth embodiment of the present invention.

DETAILED DESCRIPTION

Selected embodiments of the present invention will now be described with reference to the accompanying drawings. It will be apparent to those skilled in the art from this disclosure that the following descriptions of the embodiments of the invention are provided for illustration only and not for the purpose of limiting the invention as defined by the appended claims and their equivalents.

Figure 1:
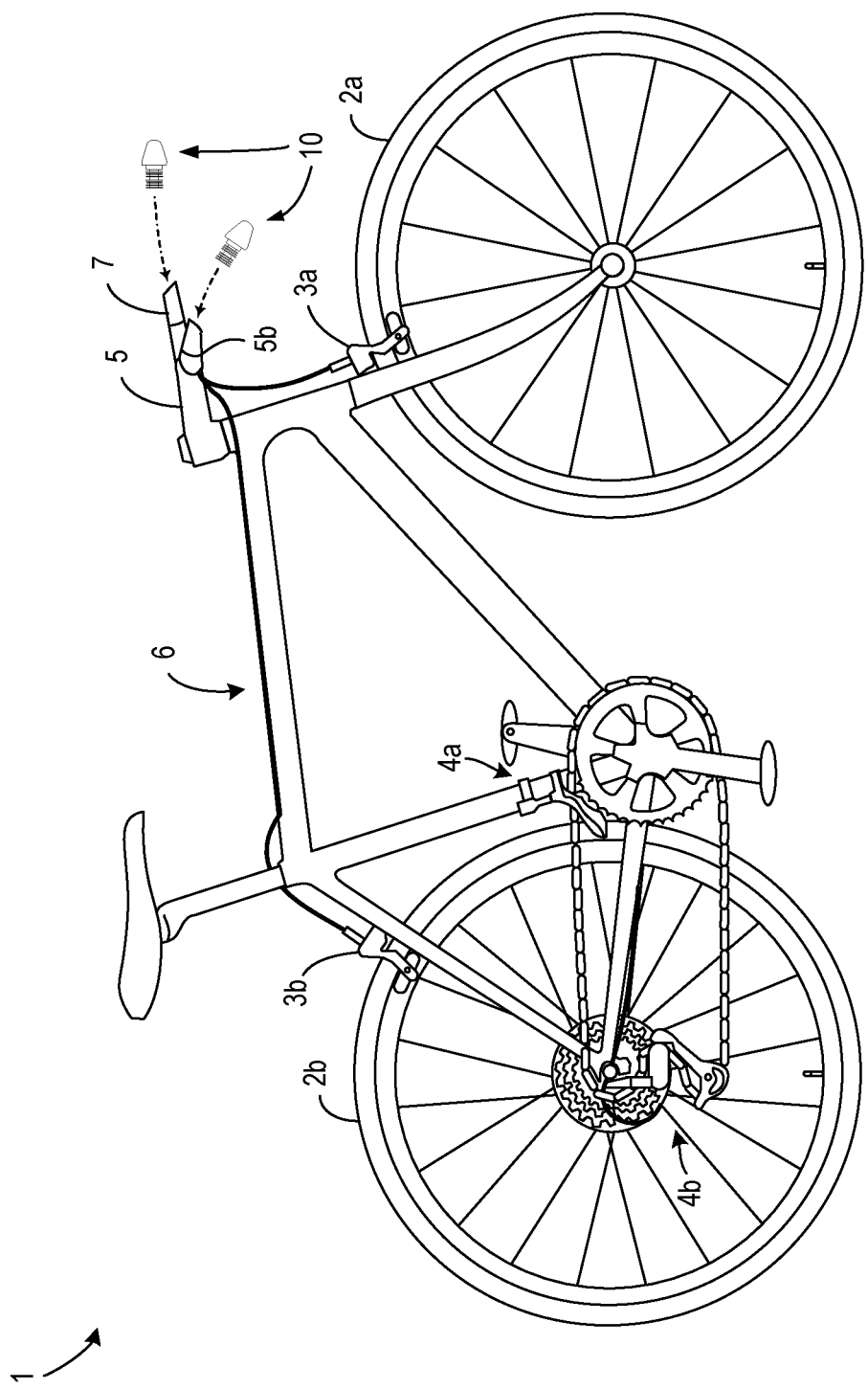
FIG. 1 illustrates a bicycle operating device provided on a bicycle according to one embodiment of the present invention.

Referring initially to FIG. 1, a bicycle operating device 10 is provided according to one embodiment of the present invention. A bicycle 1 is provided with a bicycle operating device 10 having a mounting structure that is configured to be press fitted into a free end 5b of the bicycle handlebar 5. Alternatively, the mounting structure may be configured to be press fitted into a free end of an aero bar 7, or any other attachment that is provided with the handlebar 5. The bicycle operating device 10 may constitute brake/shift control devices or other control devices that affect the operation of the bicycle, constituting parts of the brake and shift control systems of the bicycle. Thus, the bicycle operating device 10 may be coupled to bicycle components, such as a front derailleur 4a or the rear derailleur 4b that are provided on a frame 6 to change gears on a front wheel 2a or a rear wheel 2b, respectively. Alternatively, the bicycle operating device 10 may be coupled to a front brake 3a or rear brake 3b of the bicycle 1 that are provided on the frame 6 to apply brakes on a front wheel 2a or a rear wheel 2b, respectively. It will be appreciated that the bicycle operating device 10 may be coupled to other components of the bicycle 1, such as an electrically operated bicycle suspension or an electrically operated height adjustable seatpost in other embodiments.

Figure 2:
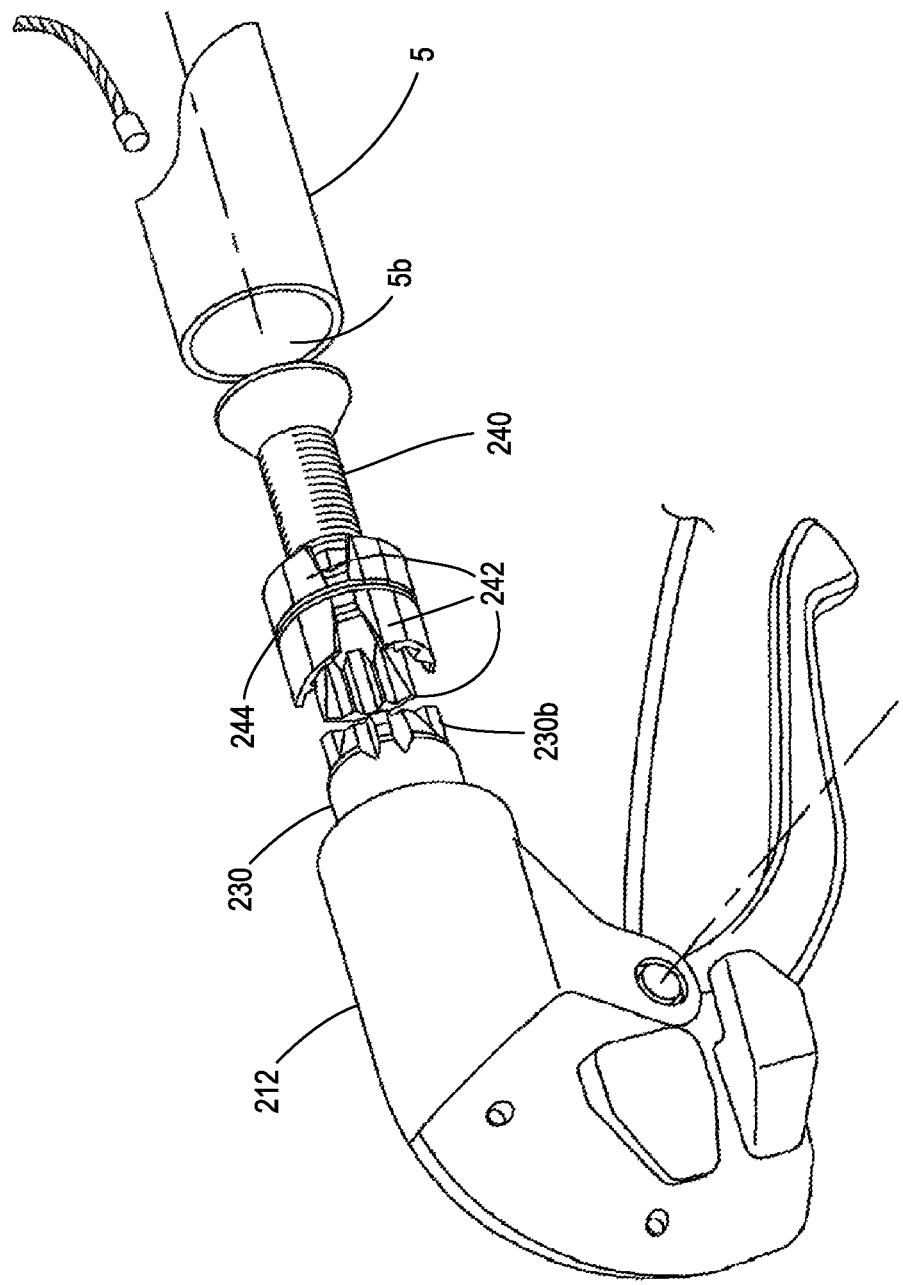
FIG. 2 illustrates a conventional art bar-end type shifter mounted on a handlebar of a bicycle according to one embodiment of the prior art.

Referring to FIG. 2, a conventional art bar-end type shifter 212, mounted onto a bicycle handlebar 5, is described. The conventional bar-end type shifter 212 is provided with expansion members 242 that are coupled together by an expandable ring member 244. In this configuration, when the fixing bolt 240 is rotated to move towards the outer tapered surface 230b of the handlebar mounting portion 230, the inclined surfaces of the fixing bolt 240 and the outer tapered surface 230b cooperate to move the expansion members 242 and the expandable ring member 244 radially outward, thus securely mounting the bar-end type shifter 212 in position inside the free end 5b of the handlebar 5. However, the mounting procedure is tedious for a user, since the user needs to use a tool to rotate the fixing bolt 240 after inserting the mounting structure into the free end 5b of the handlebar 5. Furthermore, in the conventional art bar-end type shifter 212, an electrical wire or a mechanical control wire is not configured to be disposed in the center of the handlebar, because there is insufficient space to pass the electrical wire or the mechanical control wire through inside the center of the handlebar 5. Thus, the user is unable to freely rotate the bar-end type shifter 212 and position it in a preferred orientation.

Referring to FIGS. 3A and 3B, a bicycle operating device 10 having a center axis A is shown according to the first embodiment of the present invention. FIG. 3A illustrates a side view of the bicycle operating device 10 from the same perspective angle of the bicycle handlebar 5 as FIG. 2, while FIG. 3B illustrates a longitudinal cross-sectional side view of the bicycle operating device 10. In this embodiment, the bicycle operating device 10 comprises a mounting structure 12 configured to be press fitted into a free end 5b of a bicycle handlebar 5 without using a tool, and an operating structure 14, which includes a housing member 30, for an operation of a bicycle component 28 that is operatively coupled to the bicycle operating device 10. In this embodiment, the housing member 30 of the operating structure 14 may be coupled to the mounting structure 12 by snap-fit, bolt fastener, welding, bonding, adhesive, and/or the like and comprise resin material. In the first embodiment, the length of the housing member 30 in an axial direction parallel to the center axis A is preferably less than 35 mm, and more preferably 28 mm or less. Since the length of the housing member 30 is shorter than the conventional bar-end type shifter, it is difficult for the rider to grip the housing member 30 during riding. Thus, it urges the rider to grip not the housing member 30, but the handlebar 5 and it leads to a reduction of a load applied to the housing member 30 by the rider. As described previously, the bicycle component 28 may be any component of the bicycle, such as brakes or derailleurs, which may be operatively coupled to the bicycle operating device 10. In FIGS. 3A, 3B, 6A, and 6B, the bicycle component 28 is depicted as a rear derailleur, although the bicycle component may be another component such as a front derailleur, front or rear brake, etc.

Referring to FIG. 3B, the mounting structure 12 includes a holding member 16, which includes a plurality of holding portions 18 that are configured to hold the mounting structure 12 in the free end 5b of the bicycle handlebar 5. The holding member 16 is preferably made of a resin material, such as polyamide, fiber reinforced plastics, glass reinforced plastics, and rubber, among others, or any other flexible material so that the holding member 16 is at least partly elastically deformable. The holding member 16 preferably has an annular shape, but may be of any other shape that conforms to the dimensions of the interior of the free end 5b of the bicycle handlebar 5. In FIG. 3B, the dotted lines B and C illustrate the outline of the inner peripheral surface of the free end 5b of the bicycle handlebar 5 that the holding member 16 must adapt to when being press fitted in place. In accordance with this embodiment of the present invention, even if the lengths of the individual holding portions 18 exceed the dimensions of the interior of the bicycle handlebar 5 as outlined by the dotted lines B and C, the holding member 16 is configured to deform when the mounting structure 12 is press fitted into the free end 5b of the bicycle handlebar 5. To further facilitate the deformation of the holding portions 18, the plurality of holding portions 18 is disposed along an axial direction parallel to the center axis A so that a gap is formed between the adjacent holding portions 18, providing even more space for deformation. Furthermore, the radial tip of the holding member 16 is deformed by the press fitting of the mounting structure 12, so that a force needed for press fitting the mounting structure 12 into the free end 5b of the bicycle handlebar 5 is less than the force needed for removing it the mounting structure 12 from the free end 5b of the bicycle handlebar 5.

Referring further to FIG. 3B, the mounting structure 12 further includes a shaft member 22 configured to extend from the operating structure 14 in an axial direction parallel to the center axis A, and the holding member 16 extends in a radial direction away from the center axis A from the shaft member 22. It will be appreciated that the lengths of the plurality of holding portions 18 in a radial direction may be different from each other (some may be longer than others in the radial direction when elastically deformed during press fitting). Alternatively, the lengths of the plurality of holding portions 18 in the radial direction may be same as each other. The holding member 16 also includes a support portion 20 disposed between the plurality of holding portions 18 and the operating structure 14 in the axial direction, and an axial length of the support portion 20 is greater than an axial length of each of the holding portions 18. In accordance with this embodiment of the present invention, the support portion 20 is arranged for the strength of the mounting structure 12 against an operating force by the rider to operate the operating structure 14. Furthermore, the axial lengths of the holding member 16 and the housing member 30 in the direction of the center axis A are configured so that the latter is shorter than or equal to the former. In other words, when the operating structure 14 includes a housing member 30 having a second axial length X2 in the direction of the center axis A, and the holding member 16 has a first axial length X1 in a direction of the center axis A, the second axial length X2 is shorter than or equal to the first axial length X1. This ensures stable support of the bicycle operating device 10 when press fitted into the bicycle handlebar 5, especially since the mounting structure 12 is not fixed by a fastener such as a bolt. However, in other embodiments, the first axial length X1 may be shorter than or equal to the second axial length X2. The shaft member 22 further includes a through hole 24, extending along the axial direction parallel to the center axis A from the operating structure 14. The center axis A passes through the through hole 24, inside which an electrical cable 26 is disposed. Since the center axis A passes through the through hole 24, the angular position of the bicycle operating device 10 with respect to the handlebar 5 about the center axis A is not restricted by the electrical cable 26 which passes through the through hole 24. Further, it is easy to adjust the angular position of the bicycle operation device 10 with respect to the handlebar 5 about the center axis A, since the mounting structure 12 is not fixed by a fastener such as a bolt but only press fitted into the free end 5b of the bicycle handlebar 5 without a tool.

Figure 4B:
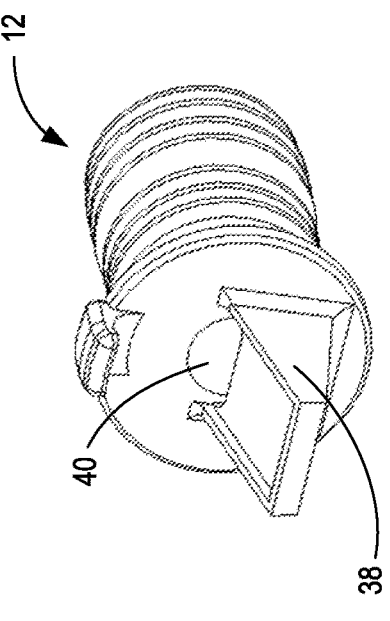
FIG. 4B illustrates a perspective view of a mounting structure of a bicycle operating device with an inlet opening and switch unit support member according to the first embodiment of the present invention.

As shown in FIG. 3B, the operating structure 14 includes an electrical switch unit 32 configured to output a signal to operate the bicycle component 28 and an electrical cable 26 electrically connected to the electrical switch unit 32, the electrical cable 26 being disposed inside the through hole 24. To support the electrical switch unit 32, the mounting structure 12 includes a switch unit support member 38, which is at least partially disposed inside the operating structure 14 (see FIGS. 4A-B for alternative cross-sectional view and perspective view with the housing member 30 and electrical switch unit 32 removed in FIG. 4B for clarity). Typically, in the first embodiment, the electrical switch unit 32 is disposed outside the bicycle handlebar 5. However, alternatively or in addition, the electrical switch unit 32 may be supported on a switch unit support member 38 that is at least partially disposed inside the operating structure 14, so that at least part of the electrical switch unit 32 is disposed within the bicycle handlebar 5 in a state where the mounting structure 12 is press fitted into the free end 5b of the bicycle handlebar 5, thus allowing the length of the housing member 30 to be shorter. The switch unit support member 38 may be included in the mounting structure 12 and integrally formed with the shaft member 22 and the holding member 16. In this embodiment, the switch unit support member 38 is disposed adjacent to the inlet opening 40 (see FIG. 4B) into which the electrical cable 26 electrically connected to the electrical switch unit 32 is inserted. At least part of the electrical switch unit 32 is disposed in the housing member 30, which comprises at least part of a peripheral surface of the operating structure 14. The peripheral surface of the operating structure 14 is substantially axially symmetrical with respect to the center axis A, so that every cross section of the peripheral surface of the operating structure 14 that is perpendicular to the center axis A is substantially a circle. The peripheral surface may be tapered in an axial direction parallel to the center axis A.

Figure 4A:
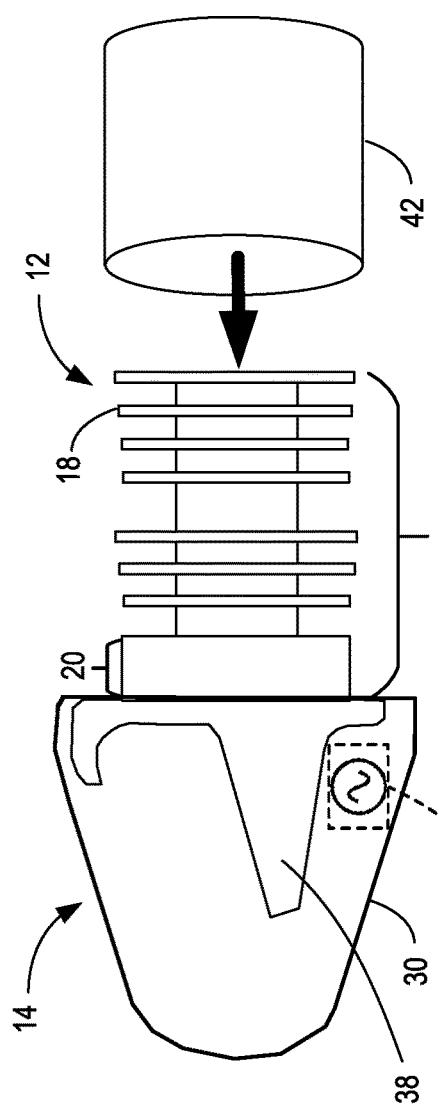
FIG. 4A illustrates a cross-sectional view of a bicycle operating device provided with a housing member, a switch unit support member, a holding member, and an additional holding member according to the first embodiment of the present invention.

Referring to FIG. 4A, the mounting structure 12 may further include an additional holding member 42, which is attached or detachably attached to the holding member 16 as indicated by the black arrow. The additional holding member 42 may be a resin sheet, made of rubber or flexible plastics, which is wound around the holding member 16 to adjust the press fitting strength between the handlebar 5 and the mounting structure 12. The additional holding member 42 is configured to adjust a diameter of the mounting structure 12. The additional holding member 42 is also configured to adjust a friction between the mounting structure 12 and the inner peripheral surface of the free end 5b of the bicycle handlebar 5. Accordingly, the mounting structure 12 can be configured to be press fitted into a free end 5b of a bicycle handlebar 5 with different inner diameters. The dimensions of the additional holding member 42 are not particularly limited, and may be provided in a tubular shape or as a spacer, tape, plate, and the like. A power supply 44 may be included in the operating structure 14, configured to supply an electrical power to the electrical switch unit 32 to transmit the wireless signal via the wireless transmitter 36 shown in FIG. 5B, thus obviating the need to configure power cables that supply electrical power from outside the operating structure 14. Alternatively, the power supply may be configured to be disposed in the mounting structure 12, or outside of the bicycle operating device 10, instead of being disposed in the operating structure 14 to downsize the dimensions of the operating structure 14. Further, the power supply may be a battery (e.g. rechargeable battery, solar battery), or an electric generator (e.g. piezoelectric elements).

Figure 5B:
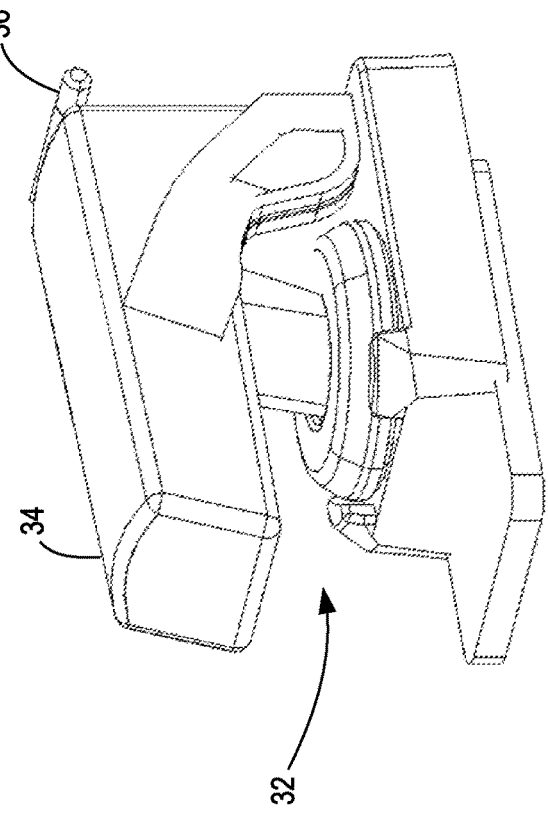
FIG. 5B illustrates an electrical switch unit according to the first embodiment of the present invention.
Figure 5A:
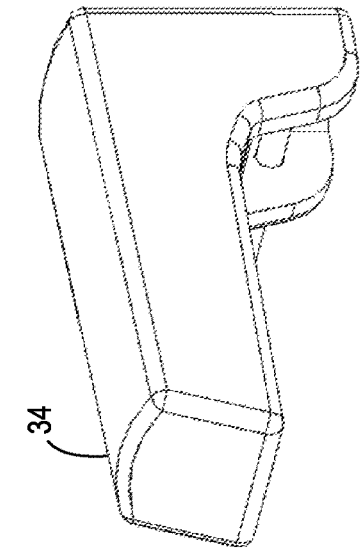
FIG. 5A illustrates a user operating member according to the first embodiment of the present invention.

Referring to FIGS. 5A and 5B, the electrical switch unit 32 includes a user operating member 34 which constitutes a part of the peripheral surface of the operating structure 14. The user operating member 34 may further be configured to be operated in a direction different from the center axis A, making the electrical switch unit conveniently accessible to be operated by a user's fingers when the handlebar is gripped by a user's hand. Specifically, the user operating member 34 is operated in a direction toward the center axis A. Alternatively or in addition, a wireless transmitter 36 may be further included in the electrical switch unit 32, configured to transmit a wireless signal to operate the bicycle component 28, thus obviating the need to configure an electrical cable that communicates with a bicycle component. It will be appreciated that the user operating member 34 does not protrude from the peripheral surface of the operating structure 14. This is to ensure that the electrical switch unit 32 is not inadvertently activated by accident.

Referring to FIGS. 6A and 6B, a bicycle operating device 110 having a center axis A is shown according to a second embodiment of the present invention. Since the structure of the second embodiment is generally similar to the first embodiment, the detailed description thereof is abbreviated here for the sake of brevity. It is to be noted that like parts are designated by like reference numerals throughout the detailed description and the accompanying drawings. FIG. 6A illustrates a side view of the bicycle operating device 110 from the same perspective angle of the bicycle handlebar 5 as FIGS. 2 and 3A, while FIG. 6B illustrates a longitudinal cross-sectional side view of the bicycle operating device 110. In this embodiment, a mounting structure 112 is configured to be mounted into a free end 5b of a bicycle handlebar 5. The operating structure 114 includes an electrical switch unit 132 configured to output a signal to operate a bicycle component 28, the operating structure 114 being coupled to the mounting structure 112.

Unlike the illustrated configuration of the first embodiment, at least part of the electrical switch unit 132 is disposed within the bicycle handlebar 5 in a state where the mounting structure 112 is mounted into the free end 5b of a bicycle handlebar 5. Accordingly, the holding member 116 of the second embodiment does not need to include a support portion that is disposed between the holding portion 118 and the operating structure 114 in an axial direction to strengthen the mounting structure 112, since a portion of the operating structure 114 functions as a support portion. It will also be appreciated that, in the illustrated configuration of the second embodiment, the electrical cable 126 is not disposed in a through hole of a shaft member. Rather, in the illustrated configuration, the electrical cable 126 is disposed outside of the mounting structure 112 and the bicycle handlebar 5, the electrical cable 126 being described as a solid line shown in FIGS. 6A and 6B. However, in an alternative configuration of the second embodiment, the electrical cable 126 may be configured like the first embodiment, disposed in a through hole of a shaft member 122 and within the bicycle handlebar 5, the electrical cable 126 being described as a broken line shown in FIG. 6A. It will be noted that, in the second embodiment, the second axial length X2 of the housing member 130 is much shorter than the first axial length X1 of the holding member 116, ensuring enhanced support of the bicycle operating device 110 when press fitted into the bicycle handlebar 5.

Figure 7:
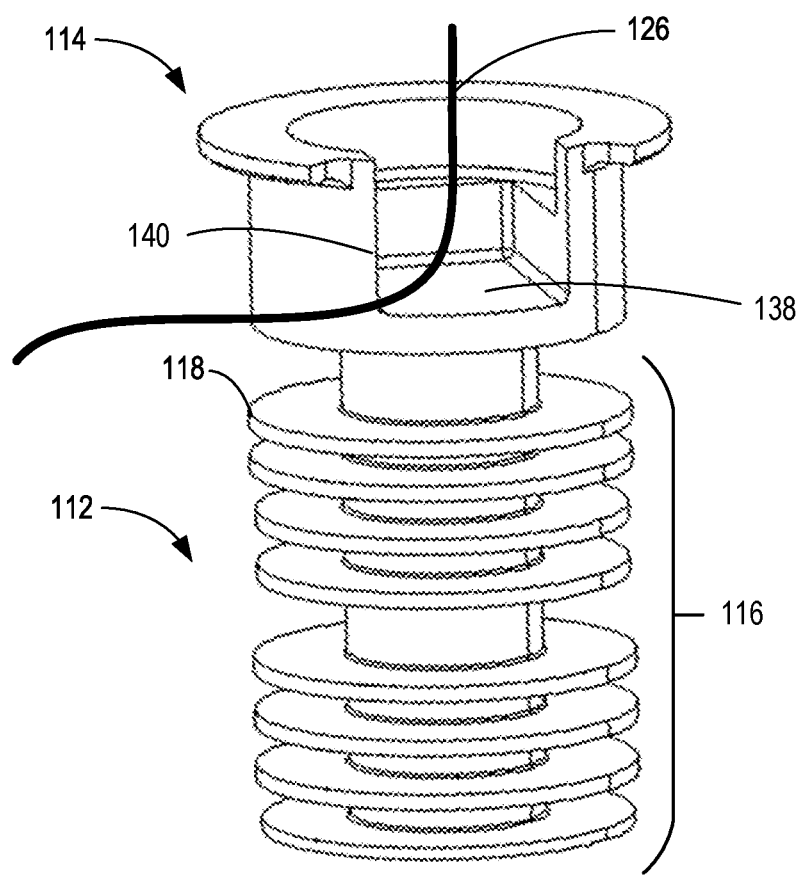
FIG. 7 illustrates a perspective view of a holding member and switch unit support member of a bicycle operating device according to the second embodiment of the present invention.

Referring to FIG. 7, the mounting structure 112 and operating structure 114 of the second embodiment are depicted with the electrical switch unit, user operating member, and housing member removed for clarity. Unlike the first embodiment, the second embodiment does not include an inlet opening into which the electrical cable 126 electrically connected to the electrical switch unit is inserted. Instead, the electrical cable 126 is inserted into the cutout portion 140, which is provided on a lateral wall of the operating structure 114, so that the electrical cable 126 is disposed outside of the mounting structure 112 and the bicycle handlebar 5. However, in other configurations of the second embodiment, the electrical cable 126 may be configured like the first embodiment, inserted into an inlet opening and disposed within the bicycle handlebar 5b. Furthermore, the switch unit support member 138 is configured to support the electrical switch unit adjacent to the cutout portion 140, so that an electrical cable 126 electrically connected to the electrical switch unit extends from the operating structure 114 to be disposed outside of the mounting structure 112 and the bicycle handlebar 5.

Referring to FIGS. 8A-C, an electrical switch unit 132 and user operating member 134 of the second embodiment are depicted along with a housing member 130. In FIG. 8A, the user operating member 134 of the electrical switch unit 132 is shown separately from the housing member 130. In FIG. 8B, the housing member 130 is depicted in isolation. In FIG. 8C, the housing member 130 and the user operating member 134 of the electrical switch unit 132 are depicted when assembled together as one operating structure 114. In accordance with the second embodiment, the user operating member 134 is configured to be operated in an axial direction parallel to the center axis A, with the user operating member 134 constituting a part of the peripheral surface of the operating structure. The housing member 130 is configured in a torus shape with an inner diameter that fits the shape of the exposed surface of the user operating member 134, and an outer diameter that is configured to substantially contact and cover the entire rim and outer diameter of the bicycle handlebar 5, when the bicycle operating device 110 is press fitted into the bicycle handlebar 5. In the second embodiment, the length of the housing member 130 in an axial direction parallel to the center axis A is preferably less than 35 mm, and more preferably 5 mm or less. Alternatively, the length may be of another suitable dimension. Compared to the first embodiment, the first axial length X1 of the holding member 116 is substantially longer than the second axial length X2 of the housing member 130, ensuring enhanced support of the bicycle operating device 110 inside the bicycle handlebar 5. It will be appreciated that, despite the shortened length of the housing member 130 relative to the first embodiment, the peripheral surface of the operating structure 114 is still tapered in an axial direction parallel to the center axis A. It will also be noted that the electrical switch unit 132 includes a user operating member 134 which constitutes a part of the peripheral surface of the operating structure 114. The user operating member 134 may further be configured to be operated in a direction parallel to the center axis A. More specifically, the user operating member 134 may further be configured to be operated toward the free end 5b of the bicycle handlebar 5. This ensures stable support of the bicycle operating device 110 when the user operating member 134 is operated by a user's finger.

Referring to FIGS. 9A and 9B, a bicycle operating device 310 having a center axis A is shown according to a third embodiment of the present invention. Since the structure of the third embodiment is generally similar to the first and second embodiments, the detailed description thereof is abbreviated here for the sake of brevity. It is to be noted that like parts are designated by like reference numerals throughout the detailed description and the accompanying drawings. FIG. 9A illustrates a side view of the bicycle operating device 310 from the same perspective angle of the bicycle handlebar 5 as FIGS. 2, 3A, and 6A, while FIG. 9B illustrates a longitudinal cross-sectional side view of the bicycle operating device 310. In this embodiment, the mounting structure 312 that is mounted into a free end 5b of a bicycle handlebar 5 has a holding member 316 with a plurality of tapered, wedge-shaped holding portions 318. The operating structure 314 includes a curved user operating member 334 that is coupled to a curved housing member 330. An electrical cable 326 passes along the central axis A of the bicycle handlebar 5 and bicycle operating device 310 to electrically connect the electrical switch unit 332 with a bicycle component 28. In this embodiment, the length of the housing member 330 in an axial direction parallel to the center axis A is preferably 13 mm or less. Like the second embodiment, when the first axial length X1 in a direction of the center axis A is defined as the length of the holding member 316, and the second axial length X2 in the direction of the center axis A is defined as the length of the operating structure 314, the second axial length X2 is shorter than or equal to the first axial length X1, thus ensuring stable support of the bicycle operating device 310 when press fitted into the bicycle handlebar 5.

Referring to FIG. 9B, the user operating member 334 is pivotally attached to one of the mounting structure 312 and a housing member 330 of the operating structure 314 about a pivot axis D, which is substantially perpendicular to the center axis A. The center axis A intersects the user operating member 334. In this view, the housing member 330 has been removed for clarity. The electrical switch unit 332 includes a button 335 that is located on an opposite side of the center axis A from the pivot axis D as viewed from an axial direction of the pivot axis D. The user operating member 334 includes a curved shape as viewed from an axial direction of the pivot axis D. The pivot axis D is located at one end of one of the mounting structure 312 and the housing member 330. The user operating member 334 extends from the pivot axis D to the other end of one of the mounting structure 312 and the housing member 330 as viewed from the axial direction of the pivot axis D. A circuit board 337, electrically connected by an electrical cable 326 to the electrical cable connector 317, is provided adjacent to the button 335 within the electrical switch unit 332 to output a signal to operate the bicycle component 28. The electrical cable connector 317, electrically connected by the electrical cable 326 to the bicycle component 28, has an indentation 317b that accommodates a restricting part 321 included in the mounting structure 312 to hold the electrical cable connector 317 in place and restrict its axial movement. On the other hand, the electrical cable connector 317 may allow free radial movement of the electrical cable 326 to relieve cable tension.

For example, when a user operates the bicycle operating device 310 by pressing against the user operating member 334, the user operating member 334 moves about a pivot 323 defining the pivot axis D, and depresses the button 335, thereby activating the electrical switch unit 332. In response, the circuit board 337 within the electrical switch unit 332 outputs a signal that is conducted along the electrical cable 326, through the electrical cable connector 317 to the bicycle component 28 which receives the signal. It will be appreciated that the pivot 323 and/or the button 335 may be equipped with a spring or other elastic mechanism that creates some resistance when the user presses against the user operating member 334 and the button 335.

Referring to FIGS. 9B and 10, the mounting structure 312 includes a holding member 316, which includes a plurality of holding portions 318 that are configured in wedged shapes to hold the mounting structure 312 in the free end 5b of the bicycle handlebar 5. Since the bicycle handlebar 5 may come in different diameters, the holding member 316 is selected from a plurality of differently sized holding members, each having a different outside diameter. Accordingly, a user may select a holding member with an outside diameter that is the appropriate size for the bicycle handlebar 5. Like the first and second embodiments, the holding member 316 is at least partly elastically deformable, so that it deforms when the mounting structure 312 is press fitted into the free end 5b of the bicycle handlebar 5 to accommodate its diameter. The wedged shapes are achieved by tapering at least one of the plurality of holding portions 318 in an axial direction parallel to the center axis, so that the diameter of each holding portion 318 becomes smaller as it extends away from the operating structure 314. Namely, at least one of the plurality of holding portions 318 includes a first outer periphery with a first outer diameter and a second outer periphery with a second outer diameter. The first outer diameter is less than the second outer diameter and the second outer periphery is located closer to the operating structure 314 than the first outer periphery. Accordingly, the force needed to remove the bicycle operating device 310 from the bicycle handlebar 5 is more than the force needed to press fit it into place. The holding member 316 may also include a non-tapered support portion 320 disposed between the holding portion 318 and the operating structure 314 in the axial direction.

Figure 11:
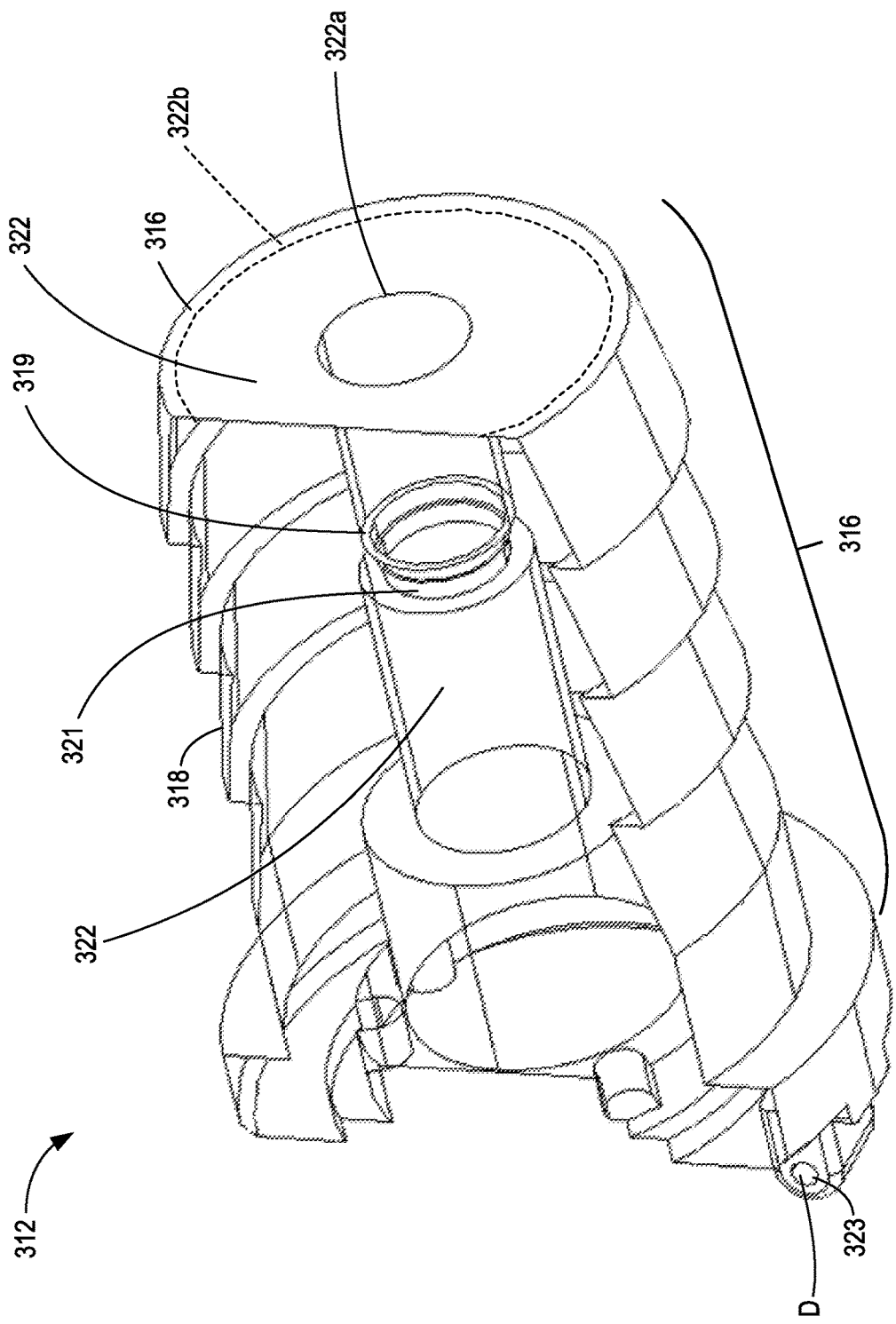
FIG. 11 illustrates a perspective view of a mounting structure showing the holding member and the shaft member according to the third embodiment of the present invention.

Referring to FIG. 11, an open cross-sectional view of the mounting structure 312 of the third embodiment of the invention is shown, exposing the inside of the mounting structure 312, which includes an electrical connector holder 319 supporting the electrical cable connector, where the electrical cable connector (not shown) is snap-fitted into the electrical connector holder 319. The electrical cable connector and electrical cable have been removed from this view for clarity. In this embodiment, the mounting structure 312 includes a shaft member 322 with a holding portion 318 formed on an external surface 322b of the shaft member 322. The electrical connector holder 319 is formed on an internal surface 322a of the shaft member 322. The electrical connector holder 319 is formed as a two-step protrusion, and one of the steps of the protrusion is a restricting part 321 that engages with the electrical cable connector and restricts its axial movement, preventing it from sliding toward or away from the user operating member 334.

As illustrated in FIG. 11, it will be appreciated that the holding member 316 is a separate member from the shaft member 322 and configured to be detachably attached to the shaft member 322. When viewed from the axial direction of the center axis A, the shaft member 322 forms a hollow cylinder with an external circumference that forms the external surface 322b and a hollow cavity with an internal circumference that forms the internal surface 322a, within which the electrical cable connector is accommodated. The internal surface of the holding member 316 directly contacts and forms an interface with the external circumference of the shaft member 322 to substantially cover the entire external surface 322b of the shaft member 322. The materials comprising the holding member 316 and the shaft member 322 are selected to achieve a preferred coefficient of friction between the two materials, which is not so high so as to prevent the user from easily detaching the holding member 316 to replace with a differently sized holding member, but not so low so as to cause the holding member 316 to easily slide off the shaft member 322 during normal usage. Further, the external surface 322b of the shaft member 322 and the internal surface of the holding member 316 may undergo a surface roughening treatment to further adjust the coefficient of friction.

Referring to FIG. 12, a mounting structure 412 is shown according to a fourth embodiment of the present invention. Since the structure of the fourth embodiment is generally similar to the third embodiment, the detailed description thereof is abbreviated here for the sake of brevity. The mounting structure 412 may further include at least an additional holding member 442, which is attached or detachably attached to the holding member 416. In this embodiment, the additional holding member 442 includes a plurality of elastic rings that are provided between the holding portions 418. The shape of each holding portion 418 may be modified so that at least part of the surface is substantially parallel to the center axis of the mounting structure 412, each holding portion 418 defining a gap that accommodates an additional holding member 442. The additional holding member 442 may include an elastic ring, made of rubber or flexible plastics, and the elastic ring may be embodied as an O-ring. Accordingly when the user press fits the mounting structure 412 into the bicycle handlebar 5, both the holding member 416 and additional holding member 442 deform to accommodate the diameter of the handlebar 5. Compared to the second and third embodiments, the mounting structure 412 may provide additional contact points with the interior of the handlebar 5 to improve friction and adhesion. Further, by selecting attachment of the additional holding member 442, it is possible to adjust an outer diameter of the mounting structure 412 in accordance with the diameter of the handlebar 5 to which the mounting structure 412 is press fitted. The detachable additional holding member 442 may be configured to be selected from differently sized additional holding members.

In the present embodiments, a bicycle operating device is mounted to an end of a handlebar in a press-fitting manner. This achieves the potential advantage of making it quick and easy to mount the bicycle operating device to the handlebar. In accordance with the present invention, a user can freely rotate the operating device to position it in a preferred orientation. Furthermore, because expanders are not necessary, the bicycle operating device can be lighter than conventional models.

The term "comprising" and its derivatives, as used herein, are intended to be open ended terms that specify the presence of the stated features, elements, components, groups, integers, and/or steps. This concept also applies to words of similar meaning, for example, the terms "have", "include" and their derivatives.

The term "bicycle" and its derivatives, as used herein, are intended to be open ended terms that specify any vehicle or machine with a wheel that is propelled by the action of a cyclist's feet upon pedals, and encompasses outdoor bicycles, stationary bicycles, exercise cycles, indoor bicycles, and the like.

The terms of degree such as "approximately" as used herein mean a reasonable amount of deviation of the modified term such that the end result is not significantly changed (e.g., manufacturing tolerances).

The term "detachably attached" or "detachably attaching", as used herein, encompasses configurations in which an element directly attached to another element by directly affixing the element to the other element while the element is detachable from the other element without damage; and configurations in which the element is indirectly attached to the other element via intermediate member(s) while the element is detachable from the other element and the intermediate member(s) without damage. This concept also applies to words of similar meaning, for example, "detachably joined", "detachably connected", "detachably coupled", "detachably mounted", "detachably bonded", "detachably fixed" and their derivatives.

While specific embodiments of the bicycle operating device have been described in detail, the particular arrangements disclosed are meant to be illustrative only and not limiting. The features of the various embodiments described above, as well as modifications thereof, may be variously combined without departing from the scope of this disclosure.

The invention claimed is:

1. A bicycle operating device having a center axis, the bicycle operating device comprising:
   an electrical switch unit;
   a mounting structure including a holding member configured to be press fitted into a free end of a bicycle handlebar; and
   an operating structure for an operation of a bicycle component, the operating structure being coupled to the mounting structure and at least partly disposed outside with respect to the bicycle handlebar in a state where the mounting structure is press-fitted into the free end of the bicycle handlebar, wherein
   the operating structure includes a housing member in which at least part of the electrical switch unit and a user operating member are disposed, the electrical switch unit activated in a direction non-parallel to the center axis by a movement of the user operating member; and
   a switch unit support member is non-movably provided to the holding member to directly contact the electrical switch unit and structurally support the electrical switch unit.

2. The bicycle operating device according to claim 1, wherein
   the user operating member is pivotally attached to one of the mounting structure and the housing member of the operating structure about a pivot axis.

3. The bicycle operating device according to claim 1, wherein
   the user operating member comprises a part of a peripheral surface of the operating structure.

4. The bicycle operating device according to claim 3, wherein
   the peripheral surface is tapered in an axial direction parallel to the center axis.

5. A bicycle operating device having a center axis, the bicycle operating device comprising:
   an electrical switch unit;
   an operating structure for an operation of a bicycle component; and
   a mounting structure including a holding member configured to be press fitted into a free end of a bicycle handlebar, the holding member having at least four holding portions configured to hold the mounting structure in the free end of the bicycle handlebar, wherein
the operating structure includes a housing member in which at least part of the electrical switch unit and a user operating member are disposed;
the electrical switch unit is activated in a direction non-parallel to the center axis by a movement of the user operating member; and
a switch unit support member is non-movably provided to the holding member to directly contact the electrical switch unit and structurally support the electrical switch unit.

6. The bicycle operating device according to claim 5, further comprising:
a support portion disposed between the holding portions and the operating structure in an axial direction parallel to the center axis.

7. The bicycle operating device according to claim 6, wherein
an axial length of the support portion is greater than an axial length of each of the holding portions.

8. The bicycle operating device according to claim 5, wherein
the plurality of holding portions is disposed along an axial direction parallel to the center axis so that a gap is formed between adjacent holding portions.

9. The bicycle operating device according to claim 6, wherein
a diameter of each of the holding portions being larger than or equal to a diameter of the support portion.

10. A bicycle operating device having a center axis, the bicycle operating device comprising:
an electrical switch unit;
an operating structure for an operation of a bicycle component; and
a mounting structure including a holding member configured to be press fitted into a free end of a bicycle handlebar, the holding member having a plurality of holding portions configured to hold the mounting structure in the free end of the bicycle handlebar, a diameter of each of the holding portions being larger than or equal to a diameter of an interior of the bicycle handlebar, wherein
a switch unit support member is non-movably provided to the holding member to directly contact the electrical switch unit and structurally support the electrical switch unit.

11. The bicycle operating device according to claim 10, wherein
a support portion is disposed between the holding portions and the operating structure in an axial direction parallel to the center axis.

12. The bicycle operating device according to claim 11, wherein
an axial length of the support portion is greater than an axial length of each of the holding portions.

13. The bicycle operating device according to claim 10, wherein
the plurality of holding portions is disposed along an axial direction parallel to the center axis so that a gap is formed between adjacent holding portions.

14. A bicycle operating device having a center axis, the bicycle operating device comprising:
an electrical switch unit;
an operating structure including a housing member and configured to operate a bicycle component;
a mounting structure including a holding member configured to be press fitted into a free end of a bicycle handlebar, the holding member having a plurality of holding portions configured to hold the mounting structure in the free end of the bicycle handlebar, the holding member including a through hole extending through a lengthwise dimension of the holding member, wherein
the center axis is aligned with the through hole so that the center axis passes through the through hole; and
a switch unit support member is non-movably provided to the holding member to directly contact the electrical switch unit and structurally support the electrical switch unit.

15. The bicycle operating device according to claim 14, wherein
the electrical switch unit is configured to output a signal to operate the bicycle component.

16. The bicycle operating device according to claim 14, wherein
an electrical cable is disposed inside the through hole.

17. The bicycle operating device according to claim 16, wherein
the electrical cable is configured to be electrically connected to an electrical switch configured to output a signal to operate the bicycle component.

18. The bicycle operating device according to claim 14, wherein
the mounting structure further includes a shaft member extending along an axial direction parallel to the center axis, and
the through hole extends through the shaft member.

19. The bicycle operating device according to claim 18, wherein
the shaft member is configured to be detachably attached to the holding member.

* * * * *